United States Patent
Wiles et al.

(10) Patent No.: US 9,079,365 B2
(45) Date of Patent: Jul. 14, 2015

(54) CURABLE ASSEMBLY AND A FILLER COMPONENT

(75) Inventors: Gary Wiles, Isle of Wight (GB); Peter Michael Baker, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 0 days.

(21) Appl. No.: 13/572,790

(22) Filed: Aug. 13, 2012

(65) Prior Publication Data

US 2013/0048187 A1 Feb. 28, 2013

(30) Foreign Application Priority Data

Aug. 31, 2011 (GB) .................................. 1114997.8

(51) Int. Cl.
| | |
|---|---|
| F16B 11/00 | (2006.01) |
| B29C 70/34 | (2006.01) |
| B29C 70/08 | (2006.01) |
| B29C 70/86 | (2006.01) |
| B29K 63/00 | (2006.01) |
| B29K 77/00 | (2006.01) |
| B29K 307/04 | (2006.01) |

(52) U.S. Cl.
CPC ............ *B29C 70/345* (2013.01); *B29C 70/086* (2013.01); *B29C 70/86* (2013.01); *B29K 2063/00* (2013.01); *B29K 2077/00* (2013.01); *B29K 2307/04* (2013.01); *Y02T 50/433* (2013.01); *Y10T 156/10* (2015.01); *Y10T 403/47* (2015.01); *Y10T 428/24479* (2015.01)

(58) Field of Classification Search
CPC ...... B29C 70/04; B29C 70/086; B29C 70/34; B29C 70/345; B29C 70/685; B29C 70/86; B29C 66/05; B29C 66/10; B29C 66/43421; B29C 66/43441; B29C 66/474; B29C 66/496; Y02T 50/43; Y02T 50/433; B29K 2307/04; Y10T 156/10; Y10T 428/24479; Y10T 403/47
USPC ............ 428/156; 403/42, 169–178, 204, 205, 403/265

See application file for complete search history.

(56) References Cited

U.S. PATENT DOCUMENTS 5,827,383 A * 10/1998 Campbell et al. ............ 156/73.1
5,981,023 A * 11/1999 Tozuka et al. ................ 428/105

FOREIGN PATENT DOCUMENTS

WO   WO 2010144007 A1 * 12/2010

* cited by examiner

*Primary Examiner* — Maria Veronica Ewald
*Assistant Examiner* — Nancy Johnson
(74) *Attorney, Agent, or Firm* — Lowe Hauptman & Ham, LLP

(57) ABSTRACT

A curable assembly which upon the application of curing conditions will form a completed component or part component comprises two pieces of composite fiber-reinforced, resin matrix material, with filler component of relatively rigid material arranged therebetween. The intermediate component is arranged to be secured between the two pieces. The filler component has a body with first and second opposing surface profiles. The filler component can be used to transmit or react a consolidating load during curing.

14 Claims, 7 Drawing Sheets

CURABLE ASSEMBLY AND A FILLER COMPONENT

RELATED APPLICATIONS

Figure 1A:
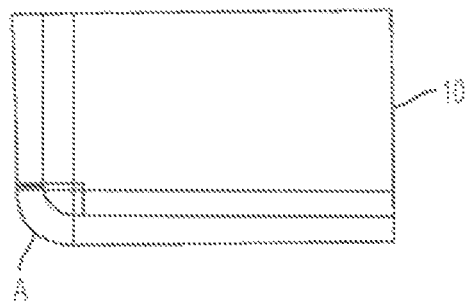

The present application is based on, and claims priority from, British Application Number 1114997.8, filed Aug. 31, 2011, the disclosure of which is hereby incorporated by reference herein in its entirety.

The present invention relates to the manufacture of composite components, in particular curable composite components for example made from carbon fibre reinforced epoxy resin.

When manufacturing components from composite material, for example, carbon fibre reinforced epoxy resin matrix material, multiple components may be required to be cured simultaneously to provide a single final part. Curing typically requires the application of an elevated temperature for a predetermined time and often the application of a consolidating pressure to assist in curing and to apply a particular profile by means of a die. Where this co-curing of components is necessary, there is a requirement for consistent curing and consolidating conditions across all of the co-cured components. It is important to ensure that there is sufficiently consistent consolidation applied to the curing components to achieve the required quality of final part.

Typically, components are heated and have a consolidating tool applied to them to apply pressure. The tool typically has a die face which applies a particular form to the cured component.

It is important that sufficient consolidation is provided to ensure that the final component thickness is accurate and that the inner quality of the, typically, laminate material in terms of porosity and fibre volume content meets the quality requirements specified for the particular part.

Co-curing of multiple composite components can create the necessity for complex tooling to provide sufficient and consistent consolidation across all components. Such complex tooling can hinder high volume manufacture due to the time taken to set up the parts in the tool and to remove from the tool after the curing. The tooling itself is complex and can be expensive to manufacture and maintain.

It is known when manufacturing "back to back" components to provide "noodles" to fill the void under radii. These are ineffective where a void is formed as a result of darting the laminate or where re-entrant tooling is necessary.

It is an object of the invention to provide an improved curable assembly.

According to the first aspect of the invention there is provided a curable assembly, which, upon the application of curing conditions will form a completed component or part component, the assembly comprising:

a first curable piece of composite fibre-reinforced, resin matrix material, a second curable piece of composite fibre-reinforced, resin matrix material arranged against the first curable piece, an intermediate component arranged between the first and the second curable pieces, the intermediate component formed from a rigid material relative to the material of the first and second curable pieces before curing, whereby the intermediate component is arranged to be secured between the first and second curable pieces on application of curing conditions so as to form the completed component or part component.

In that way the issue of any voids between the first and second curable pieces of composite fibre reinforced resin matrix material is addressed by providing the intermediate component. By designing the intermediate component to form part of the completed component, the need to design for removal is eliminated, allowing the use of more complex shapes for the intermediate component to perform additional functions. For example the intermediate component can be used to react or transmit consolidating curing pressure forces applied by a curing tool in spaces previously requiring re-entrant tools.

According to the second aspect of the invention there is provided a filler component configured to be arranged, in use, between first and second curable sub-assembly parts, the filler component having a body defining a first surface having a first profile and a second substantially opposite surface having a second profile, the first surface profile being shaped to fit against the first curable surface assembly part, the second surface profile being shaped to fit against the second curable surface assembly part, the filler component being arranged to apply or to react a tooling load at at least one of the first or second surfaces during curing and wherein the filler component is arranged to remain between the first and the second surface assembly parts after curing.

In that way, rather than using lots of complex tooling to provide consolidation pressure on the co-cured components, the pre-formed shaped filler component acts both as a tooling interface during curing and an integral part of the finished component. This greatly simplifies the tooling required to manufacture complex composite components, removing the requirement for re-entrant tooling.

The filler component is preferably arranged to apply or to react a tooling load at both of the first and second surfaces. The term "apply" includes both direct application of the consolidating load or transmission of the consolidating load from a tool applied to part of the filler component.

The first profile is preferably a radius. The second profile is also preferably a radius. Most preferably, the first radius is larger than the second radius.

Where the first profile is a radius, the first curable sub-assembly may have a corresponding radius that is larger than the first profile radius. Likewise, where the second profile is a radius, the second curable sub assembly may have a corresponding radius which is larger than the second profile radius. In that way, a tighter radius can be provided by the filler component than could be adopted by part of the curable material. On application of the curing consolidation pressure, the curable sub-assemblies are forced into and against the tighter radius of the filler component.

The filler component may be elongate in form, or L-shaped, T-shaped or in a cruciform. Alternatively, the filler component could comprise three mutually orthogonal members as in X, Y and Z axes in a Cartesian reference frame. One or more of the members may pass through the "origin" of the "axis".

The filler component preferably comprises a first elongate member which has a cross section in the form of a concave ogive. That cross section comprises two back to back radiused sides and a flat base. The filler component preferably further comprises a second elongate member arranged at right angles to the first elongate member and having a cross section in the form of a part annulus. The second elongate member is arranged relative to the first elongate member to provide a flat surface against which the curable piece of fibre reinforced epoxy resin matrix material can be arranged. In that way, the curable fibre resin matrix material can be laid up against the second elongate member and can be bent around the radius defined by one of the radiused surfaces of the first elongate member. Most preferably, the filler component comprises two of said first elongate members arranged at right angles to each other and two of said second elongate members extending from the point at which the first elongate members intersect, on opposite sides thereof.

According to a third aspect of the invention there is provided a method of forming a completed component or part component, the method comprising the steps of:
providing a first curable piece of composite fibre-reinforced resin matrix material,
providing a second curable piece of composite fibre-reinforced resin matrix material,
providing an intermediate component formed from material which is rigid relative to the composite fibre-reinforced resin matrix material before it is cured,
arranging the intermediate component between the first and second curable pieces of composite fibre-reinforced resin matrix material to provide a curable sub-assembly,
applying a curing tool to the sub-assembly to apply heat and pressure to the sub-assembly, whereby the intermediate component reacts to pressure applied to the surface assembly to apply consolidating pressure to the face of the composite fibre-reinforced resin matrix material arranged away from the curing tool, and retaining the intermediate component as part of the completed component or part component.

Figure 1B:
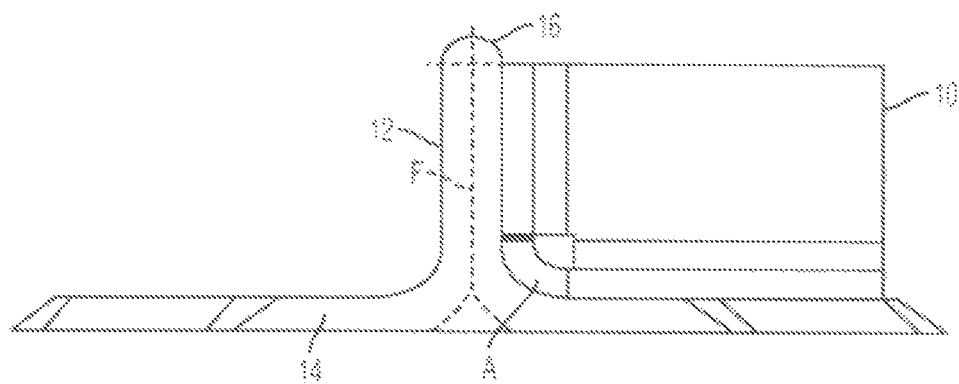
Figure 1C:
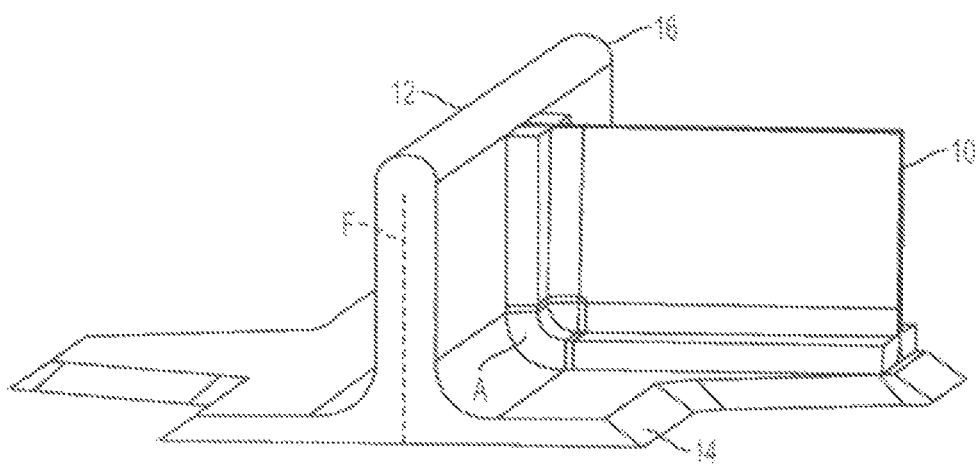
Figure 2A:
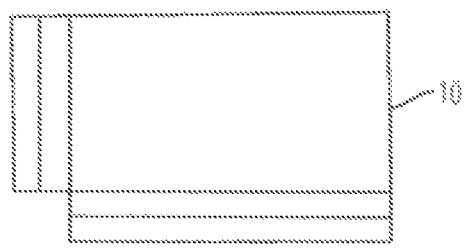
Figure 2B:
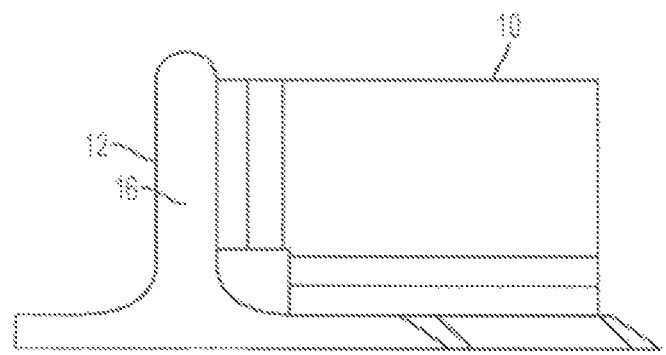
Figure 2C:
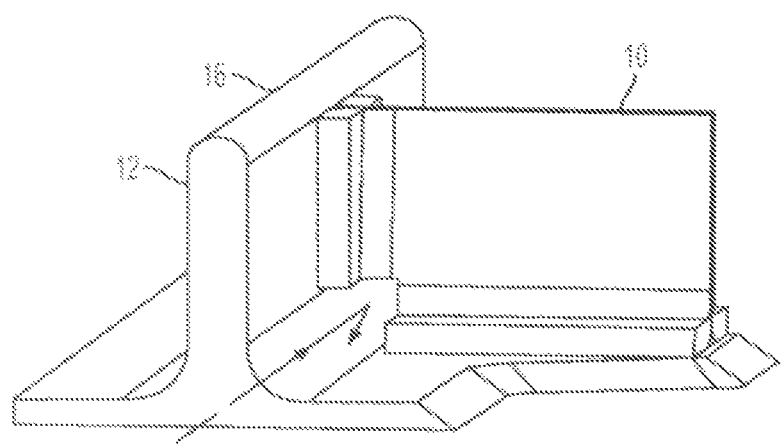
Figure 3:
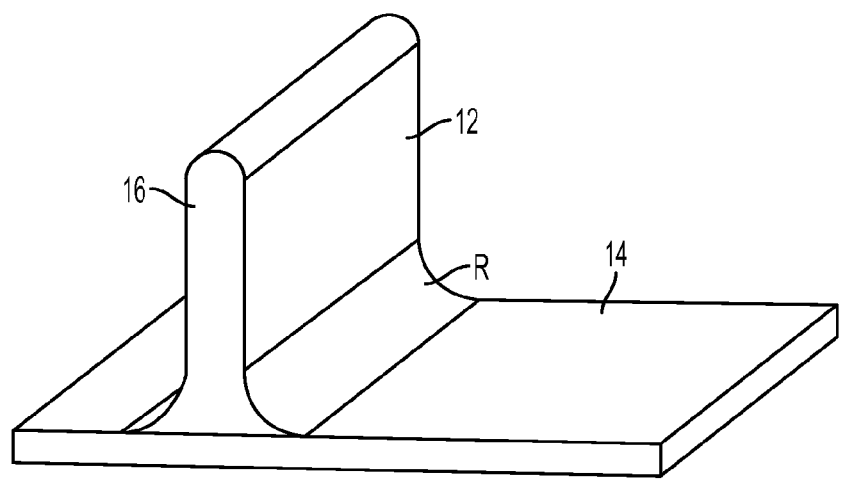
Figure 4:
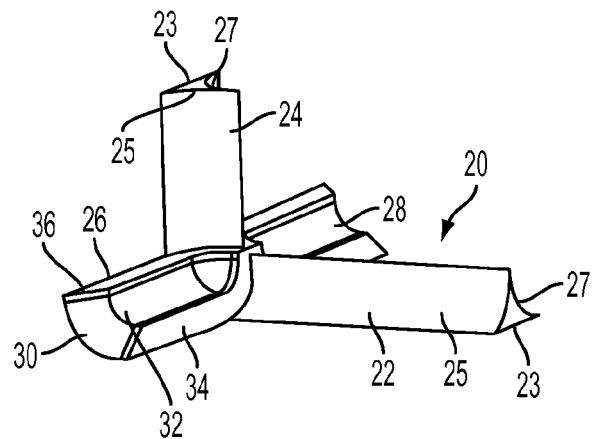
Figure 5:
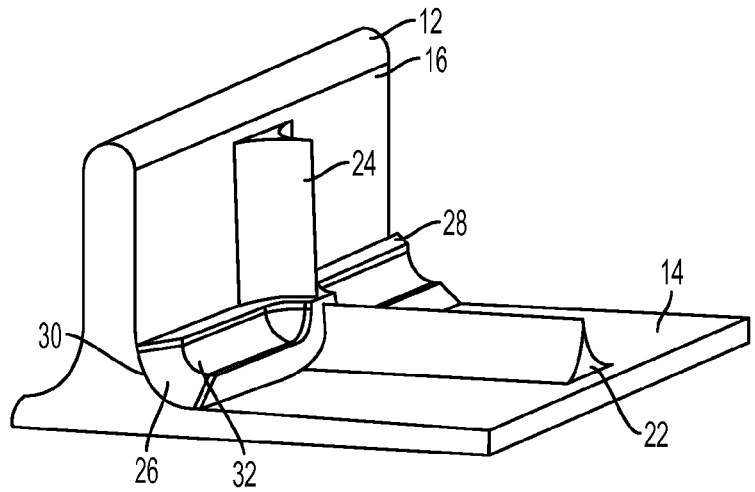
Figure 6:
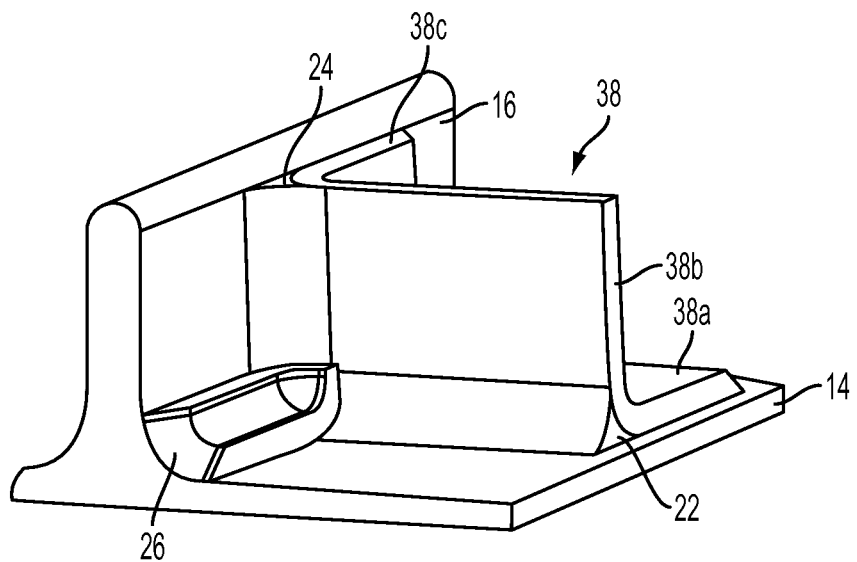
Figure 7:
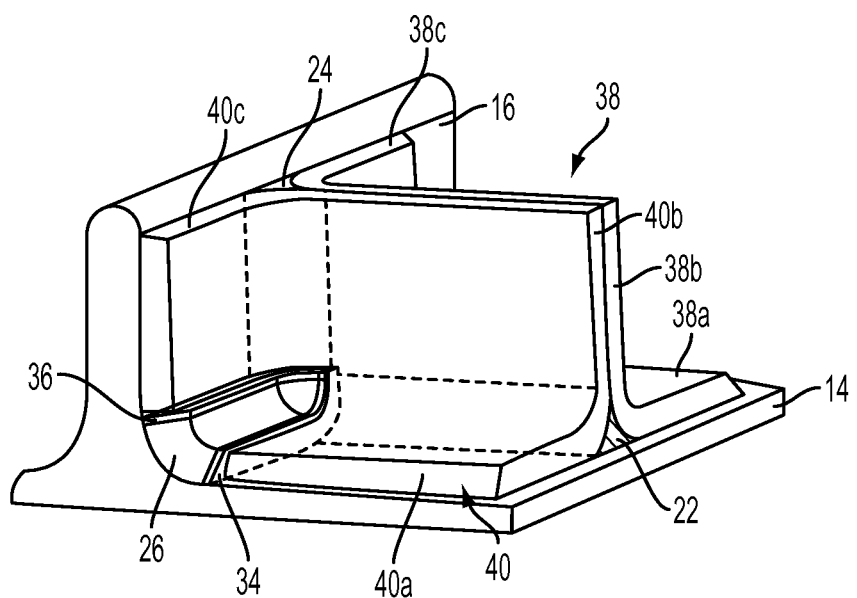
Figure 8:
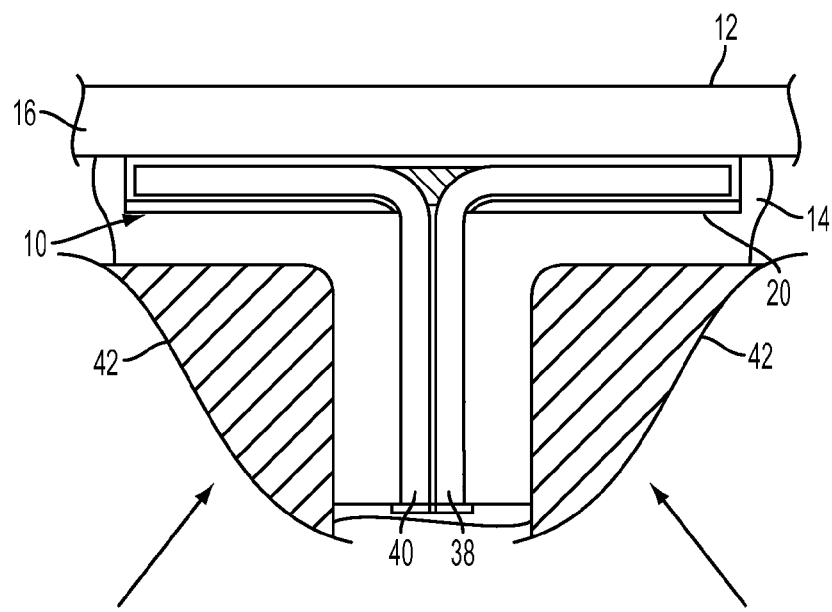
Figure 9:
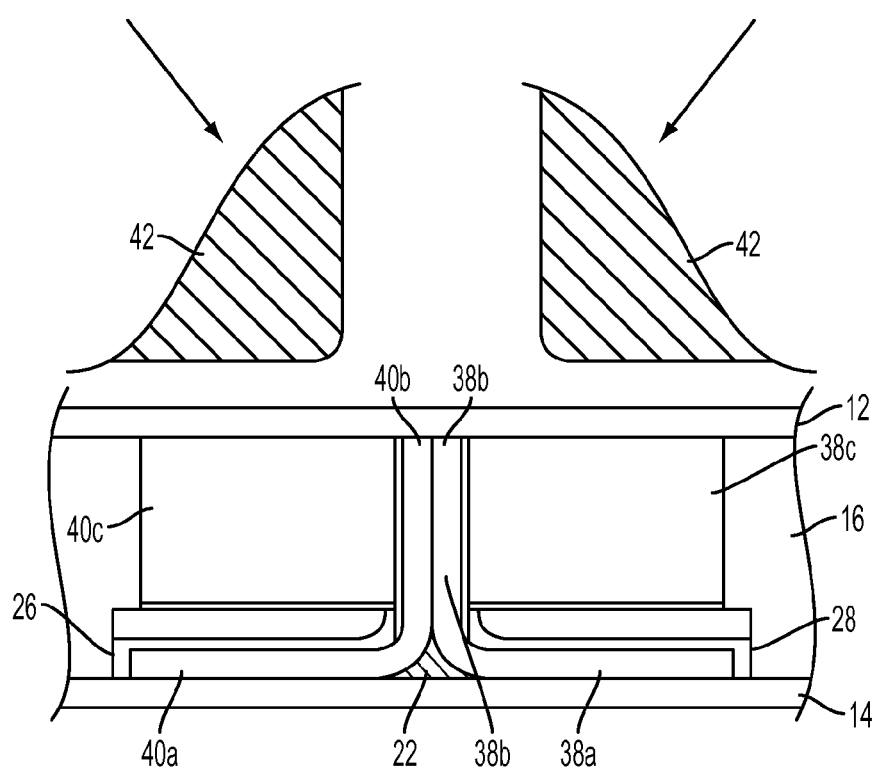
Figure 10A:
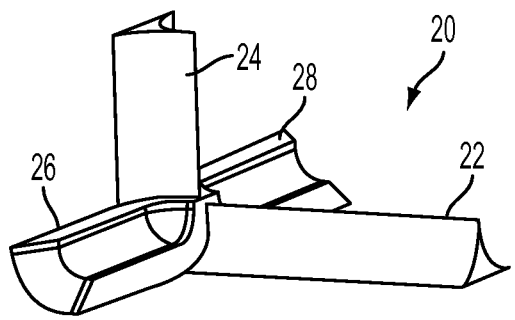
Figure 10B:
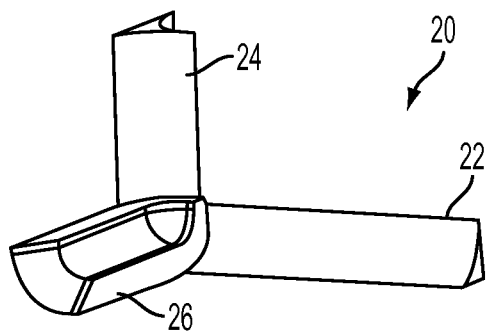
Figure 10C:
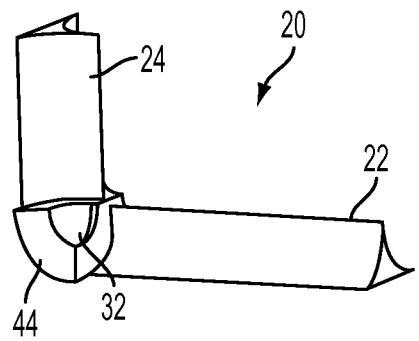
Figure 11A:
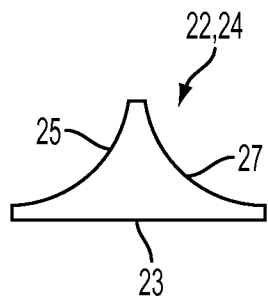
Figure 11B:
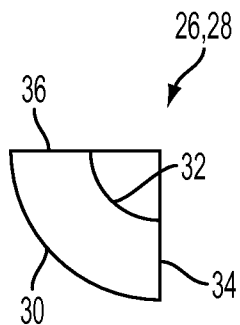
Figure 12:
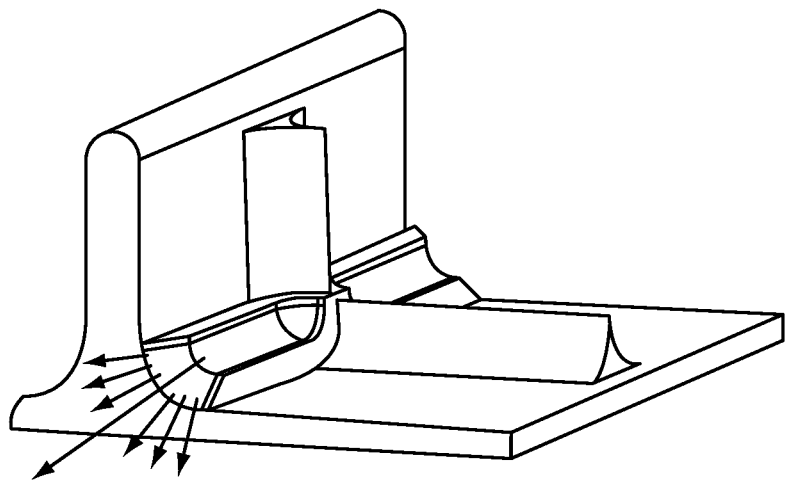

An embodiment of the invention will now be described in detail by way of example with reference to the accompanying drawings, in which:

FIGS. 1a to 1c are, respectively, an end elevation of an uncured web part of a composite component (FIG. 1a), an end elevation of the uncured web part, assembled onto an uncured rib part of a composite component (FIG. 1b) and a perspective view of the assembly shown in FIG. 1b (FIG. 1c), FIGS. 2a to 2c are similar views to FIGS. 1a to 1c respectively but with an alternative design of uncured web part to accommodate a re-entrant curing tool part, FIG. 3 is a perspective view of an uncured rib part of a composite component, FIG. 4 is a perspective view of a filler component in accordance with the second aspect of the invention, FIG. 5 is a perspective view of the filler component of FIG. 4 arranged on the uncured rib part of FIG. 3, FIGS. 6 and 7 are similar to FIG. 5 but showing, respectively, one and two sides laid up with a layer of uncured fibre-reinforced resin matrix material, FIG. 8 is a plan view of the part of the composite component showing the uncured rib part, two uncured web parts and two filler components about to have a curing tool applied to the component, FIG. 9 is a side elevation of the component of FIG. 8, FIGS. 10a to 10c are perspective views, respectively, of three alternative configurations of filler component, FIG. 11a is an end elevation of one of the web support posts of the filler component of FIG. 10a, FIG. 11b is an end elevation of one of the web abutment arms of the filler component of FIG. 10a and, FIG. 12 is a view similar to FIG. 5 showing the application of compressive force via the filler component during curing.

FIGS. 1a to 1c and 2a to 2c illustrate part of a known aerospace component made from a composite fibre-reinforced resin matrix material. The aerospace component comprises a series of ribs with strengthening webs extending between the ribs. The ribs and webs are formed from uncured fibre-reinforced resin matrix material and are cured by the application of heat and consolidating pressure from a curing tool which cures the, typically, epoxy resin to produce a final cured component.

FIG. 1a shows an uncured web part 10 of a composite aerospace component formed from uncured carbon fibre-reinforced epoxy resin matrix material. The uncured web part 10 has a substantially rectangular form with one radiused corner A.

The uncured web part 10 is arranged against an uncured rib part 12. The uncured rib part 12 comprises a rib base 14 and an upstanding rib wall 16 protruding from the base. The radiused corner A of the uncured web part 10 is designed to fit snugly into the radiused transition R from the rib base 14 to the rib wall 16.

There can be difficulties in ensuring consistent curing consolidation pressure and temperature distribution in the radiused corner A as the depth of material at the corner A is the greatest in the uncured assembly. Ensuring that sufficient consolidation pressure passes through the corner A into the rib part 12 beneath the corner is problematic.

One approach is shown in FIGS. 2a to 2c in which all the parts are substantially identical to the parts shown in FIGS. 1a to 1c and carry the same reference numerals. The uncured web part 10 in FIG. 2a has the corner part, which was radiused in FIG. 1a, cut away. The removal of that material in the corner of the uncured web part 10 allows space for a curing tool (not shown) to apply consistent consolidation and pressure to the radiused transition R between the rib base 14 and the rib wall 16. FIGS. 2b and 2c show that void where a re-entrant tool can be inserted to apply the curing temperature and consolidation pressure. Whilst that arrangement solves the problem of ensuring the even application of consolidation pressure to the radiused transition from rib base to rib wall by the use of a re-entrant tool, it does mean that a void exists in that area once the part is cured. Also, arranging a re-entrant curing tool into all of the voids across multiple web parts and rib parts is complicated and removal of the cured part from the curing tool is time consuming.

A curable assembly in accordance with the first aspect of the invention and a filler component in accordance with the second aspect to the invention solves the problem of even curing consolidation pressure and eliminates the need for re-entrant tooling.

In FIG. 3, an uncured rib part 12 of the composite aerospace component formed of composite carbon fibre-reinforced epoxy resin matrix material is shown. As in FIGS. 1 and 2, the uncured rib part 12 comprises a rib base 14 and a rib wall 16.

In FIG. 4, a filler component 20 in accordance with the second aspect of the invention is shown. The filler component 20 comprises two web support posts 22, 24 at right angles to each other and two web abutment arms 26, 28 extending from opposite sides of the point of intersection of the web support posts 22, 24.

The web support posts 22, 24 each have elongate substantially prismatic bodies which in cross section have the form of a concave ogive, having three sides 23, 25, 27, one of which is flat 23 and two sides 25, 27 each having the form of a part circumference and arranged back to back so as to intersect.

The web abutment arms 26, 28 have elongate bodies, which, in cross section, have the form of a part annulus. The annulus may describe an angle of 45° to 90°. In the filler component 20 shown in FIGS. 4 to 7 the annulus describes an angle of approximately 60°. The part annulus shape of the cross section of the elongate body provides an outer radiused surface 30, and in a radiused surface 32, a side facing flat abutment surface 34 and an upwardly facing flat abutment surface 36. The outer radiused surface 30 has a radius which is less than the radiused transition R naturally adopted between the rib base 14 and rib wall 16. The inner radiused surface 32 is arranged to receive part of a curing tool to be described later. The side and upwardly facing flat abutment surfaces 34, 36 each have a width which is greater than or equal to the thickness of uncured composite carbon fibre-reinforced resin matrix material which is used to form the web part 10 (see FIG. 7).

FIGS. 5 to 9 and FIG. 12 illustrates the steps in the method according to the third aspect of the invention.

First, the uncured rib part 12 is pre-formed from composite carbon fibre-reinforced epoxy resin material to provide an upstanding rib wall 16 and rib base 14. Because the material is in its uncured state and no compressive force has been applied to it, the transition between the upstanding rib wall 16 and the rib base 14 has a relatively large radius R.

The filler component 20 of FIG. 4 is an arranged on the uncured rib part 12 so that the outer radiused surfaces 30 of the web abutment arms 26, 28 lie against the radiused transition R between the rib wall 16 and rib base 14. The flat side 23 of web support post 22 lies against the upper surface of the rib base 14 and the flat side 23 of the web support post 24 lies against the side surface of the rib wall 16.

Then a first L-shaped piece of carbon fibre-reinforced epoxy resin matrix material 38 is laid up onto the uncured rib part 12 and filler component 20 so that one part 38a of the first L-shaped piece lies on the upper surface of the rib base 14, a second part 38b curves upwardly from the first part 38a partially supported by the web support post 22 to extend substantially orthogonally relative to the rib base 14 and rib wall 16. A third part 38c of the L-shaped piece 38 curves away from the second part 38b partially supported by the web support post 24 so as to run along and parallel with the rib wall 16 (see FIG. 6). The radiused transitions between the parts 38a and 38b and 38b and 38c respectively follow, as far as possible, the radius of the part circumference sides 27 of the web support posts 22, 24. The radiused transitions have a larger radius in the uncured state than the radius of the part circumference side 27.

A second L-shaped piece of carbon fibre-reinforced epoxy resin matrix material 40 is then laid onto the uncured rib part 12 in a mirror image of the first L-shaped piece. Thus, the second L-shaped piece has one part 40a which extends parallel to and on top of the rib base 14, an upstanding second part 40b which extends orthogonal to the rib base 14 and rib wall 16 and a third part 40c curved along and parallel with the rib wall 16. When the second L-shaped piece 40 is arranged on the uncured rib part 12, the filler component 20 is trapped between the first and second pieces 38, 40. The first part 38a, 40a of the first and second L-shaped pieces abut at one edge, respectively, the side facing flat abutment surfaces 34 of the web abutment arms 26, 28. The underside of the third parts 38c, 40c abut the upwardly facing flat abutment surface 36 of the web abutment arms 26, 28. The assembly is then ready to be cured by the application of heat over a pre-determined period of time and a consolidating pressure applied by a curing tool. A simplified example is shown in FIGS. 8 and 9.

In FIGS. 8 and 9 a curable assembly is shown from above which comprises part of an aerospace component. The curable assembly comprises an uncured rib part 12 having a base 14 on one side of an upstanding rib wall 16. An uncured web part 10, made up from first and second L-shaped pieces of uncured composite carbon fibre-reinforced epoxy resin matrix material 38, 40 are arranged against the rib wall 16, one web part 10 on each side of the rib wall 16. Each web part 10 is arranged around a filler component 20 in the manner illustrated in FIG. 7.

The uncured assembly is then subject to the application of curing heat and consolidating pressure by means of a curing tool 42. The curing tool 42 comprises a heated die tool having a surface profile which can be imparted to the surface of the composite carbon fibre-reinforced epoxy resin matrix material.

As mentioned above, the inner radiused surface 32 of the web abutment arms 26, 28 are arranged to receive the inner leading edges of the curing tools 42. The curing tools 42 compress the uncured assembly both inwardly as shown in FIG. 8 and downwardly as shown in FIG. 9 whilst applying heat for the requisite curing time. During that application of consolidating compressive force, the composite carbon fibre-reinforced epoxy resin matrix material is pushed against the filler component 20 so that the radiused transitions between the parts 38a and 38b, 38b and 38c, 40a and 40b, and 40b and 40c are pressed against and into the part circumferential faces of the sides 25, 27 of the web support posts 22, 24 so that the surfaces of the L-shaped pieces 38 and 40 in those areas assume the radius of those part circumferential sides 25, 27.

The curing tools 42 press against the filler components 20 so as to transmit the consolidating compressive force into the radiused transition R between the rib base 14 and the rib wall 16, as shown in FIG. 12. The radiused transition R adopts the radius of the outer radiused surface 30 of the web abutment arms 26, 28 and that pushes the filler component 20 into the surface of the rib part 12. That, in turn, means that the side and upwardly facing flat abutment surfaces 34, 36 of the web abutment arms 26, 28 move from being slightly proud of the parts 38a, 38c, 40a, 40c of the first and second L-shaped pieces of composite carbon fibre-reinforced epoxy resin matrix material to flush with them. Thereafter, further movement of the curing tool 42 to effect additional compressive strain acts on both the filler component and the pieces of composite carbon fibre-reinforced epoxy resin matrix material 38, 40.

FIGS. 10a to 10c illustrate various alternative configurations of filler component 20. In FIG. 10a the filler component 20 is as described in the preceding figures. In FIG. 10b, the filler component 20 has two web support posts 22, 24 arranged in an L-shape with a single web abutment arm 26 extending from the intersection of the web support posts 22, 24. Each of the web support posts 22, 24 in FIG. 10b has two flat sides and a single part circumferential side. The web abutment arm 26 is as previously described. This filler component may be used in a corner.

In FIG. 10c the filler component 20 comprises of two web support posts 22, 24 as in FIG. 10a. A curing tool receiving formation 44 is formed at the point of intersection of the web support posts 22, 24. The curing tool receiving formation 44 comprises a truncated web abutment arm 26, 28 so that the inner radiused surface 32 of the curing tool receiving formation is part spherical.

The present invention has been described in relation to the manufacture of composite carbon fibre-reinforced epoxy resin matrix material articles but it can be applied in any circumstance where a thermosetting material also requires compression in order to arrive at the final component.

The filler component 20 can be made of any suitable material but is envisaged that it is likely to be made from an appropriate plastics material, for example nylon.

The invention claimed is:

1. A curable assembly, which, upon the application of curing conditions will form a completed component or part component, the assembly comprising:
   a first curable sub-assembly part of composite fibre-reinforced, resin matrix material,
   a second curable sub-assembly part of composite fibre-reinforced, resin matrix material arranged against the first curable piece, a filler component arranged between the first and the second curable sub-assembly parts, the filler component formed from a material which is rigid relative to the material of the first and second curable sub-assembly parts before curing, whereby the filler component is arranged to be secured between the first and second curable sub-assembly parts on application of curing conditions so as to form the completed component or part component, the filler component having a first elongate member which has a cross section in the form of a concave ogive defining a first surface having a first profile and a second substantially opposite surface having a second profile, the first surface profile being shaped to fit against the first curable sub-assembly part, the second surface profile being shaped to fit against the second curable sub-assembly part, the filler component having a second elongate member arranged at a right angle to the first elongate member and having a cross section in the form of a part annulus such that the first elongate member and the second elongate member share a common plane, the filler component being arranged to apply or to react to a tooling load of at least one of the first or second surfaces during curing.

2. A filler component as claimed in claim 1, wherein the first profile is a first radius.

3. A filler component as claimed in claim 2, wherein the second profile is a second radius.

4. A filler component as claimed in claim 3, wherein the first radius is larger than the second radius.

5. A filler component as claimed in claim 2, wherein the first curable sub-assembly has a corresponding radius that is larger than the first radius.

6. A filler component as claimed in claim 3, wherein the second curable sub assembly has a corresponding radius which is larger than the second radius.

7. A filler component configured to be arranged, in use, between and at least partially exposed of first and second curable sub-assembly parts, the filler component having a first elongate member which has a cross section in the form of a concave ogive defining a first surface having a first profile and a second substantially opposite surface having a second profile, the first surface profile being shaped to fit against the first curable sub-assembly part, the second surface profile being shaped to fit against the second curable sub-assembly part, the filler component having a second elongate member arranged at a right angle to the first elongate member and having a cross section in the form of a part annulus such that the first elongate member and the second elongate member share a common plane, the filler component being arranged to apply or to react to a tooling load of at least one of the first or second surfaces during curing and wherein the filler component is arranged to remain between the first and the second sub-assembly parts after curing.

8. A filler component as claimed in claim 7, wherein the filler component is preferably arranged to apply or to react a tooling load at both of the first and second surfaces.

9. A filler component as claimed in claim 7, wherein the filler component comprises three mutually orthogonal members as in X, Y and Z axes in a Cartesian reference frame.

10. A filler component as claimed in claim 7, wherein the second elongate member is arranged relative to the first elongate member to provide a flat surface against which a curable piece of fibre-reinforced epoxy resin matrix material can be arranged.

11. A filler component as claimed in claim 7, wherein the filler component comprises two of said first elongate members arranged at right angles to each other and two of said second elongate members extending from the point at which the first elongate members intersect, on opposite sides thereof.

12. A filler component configured to be arranged, in use, between and at least partially exposed to first and second curable sub-assembly parts, the filler component having a first elongate member which has a cross section in the form of a concave ogive defining a first surface having a first profile and a second substantially opposite surface having a second profile, the first surface profile being shaped to fit against the first curable sub-assembly part, the second surface profile being shaped to fit against the second curable sub-assembly part, the filler component is L-shaped having a second elongate member arranged at a right angle to the first elongate member and having a cross section in the form of a part annulus, the filler component being arranged to apply or to react to a tooling load of at least one of the first or second surfaces during curing and wherein the filler component is arranged to remain between the first and the second sub-assembly parts after curing.

13. A filler component configured to be arranged, in use, between and at least partially exposed to first and second curable sub-assembly parts, the filler component having a first elongate member which has a cross section in the form of a concave ogive defining a first surface having a first profile and a second substantially opposite surface having a second profile, the first surface profile being shaped to fit against the first curable sub-assembly part, the second surface profile being shaped to fit against the second curable sub-assembly part, the filler component is T-shaped having a second elongate member arranged at a right angle to the first elongate member and having a cross section in the form of a part annulus, the filler component being arranged to apply or to react to a tooling load of at least one of the first or second surfaces during curing and wherein the filler component is arranged to remain between the first and the second sub-assembly parts after curing.

14. A method of forming a completed component or part component, the method comprising the steps of:
  providing a first curable sub-assembly part of composite fibre-reinforced resin matrix material,
  providing a second curable sub-assembly part of composite fibre-reinforced resin matrix material,
  providing a filler component formed from material which is rigid relative to the composite fibre-reinforced resin matrix material before it is cured,
  arranging the filler component between the first and second curable sub-assembly parts of composite fibre-reinforced resin matrix material to provide a curable sub-assembly,
  applying a curing tool to the sub-assembly to apply heat and pressure to the sub-assembly, whereby the filler component reacts to pressure applied to the surface assembly to apply consolidating pressure to the face of the composite fibre-reinforced resin matrix material arranged away from the curing tool, and retaining the filler component as part of the completed component or part component,
  the filler component having a first elongate member which has a cross section in the form of a concave ogive defining a first surface having a first profile and a second substantially opposite surface having a second profile, the first surface profile being shaped to fit against the first curable sub-assembly part, the second surface profile being shaped to fit against the second curable sub-assembly part, the filler component having a second elongate member arranged at a right angle to the first elongate member and having a cross section in the form of a part annulus such that the first elongate member and the second elongate member share a common plane.

* * * * *